United States Patent [19]
Dall'Argine et al.

[11] 3,933,084
[45] Jan. 20, 1976

[54] SQUEEZING-SHREDDING MACHINE FOR TOMATO PULP SUITABLE FOR CANNING IN THE RAW STATE

[76] Inventors: Gianfranco Dall'Argine, Via Bizzozzero No. 12; Ermes Ghiretti, Via Bezzecca No. 3, both of Parma, Italy, 43100

[22] Filed: Nov. 18, 1974

[21] Appl. No.: 524,879

[30] Foreign Application Priority Data
Nov. 22, 1973 Italy................................ 46900/73

[52] U.S. Cl. ............. 99/538; 99/510; 99/514; 99/563; 241/84; 241/87; 426/481
[51] Int. Cl.² ..................................... A23N 4/24
[58] Field of Search .......... 241/84, 84.2, 85, 86, 87; 99/510, 565, 509, 513, 514, 566, 562, 563, 495, 537, 538, 547; 100/153; 426/478, 479, 481, 484

[56] References Cited
UNITED STATES PATENTS
| | | | |
|---|---|---|---|
| 1,097,213 | 5/1914 | Crine | 426/484 |
| 2,362,126 | 11/1944 | Fry | 99/563 X |
| 3,429,348 | 2/1969 | Hirtensteiner | 99/510 |

*Primary Examiner*—Harvey C. Hornsby
*Assistant Examiner*—James A. Niegowski
*Attorney, Agent, or Firm*—Brisebois & Kruger

[57] ABSTRACT

Squeezing-shredding machine for tomato pulp comprises a conveyor at one end of which a suitable cutters cut the tomatoes along a longitudinal axis into halves and a separator device downstream of each cutter which positions each half tomato on a perforated flat conveyor which passes beneath idle pressure rollers which are suitably spaced apart.

9 Claims, 2 Drawing Figures

3,933,084

SQUEEZING-SHREDDING MACHINE FOR TOMATO PULP SUITABLE FOR CANNING IN THE RAW STATE

SUMMARY OF THE INVENTION

At the present time, various tomato processing systems are available designed to process the best quality product, namely the most perfectly shaped tomatoes, which provided they do not undergo damage during the washing, scalding or peeling operations, are canned in the form of whole peeled tomatoes.

These canned products must look perfect to the consumer in terms of their shape and appearance; consequently the percentage of rejects in the various operations is very high and influences processing costs and the cost of the final product.

One disadvantage of a technical character relative to the peeling is that excessive "scalding" of the skin can harm a thin film of tomato pulp and damage the sugary layers present immediately under the skin, favouring the formation of an organic liquid which degrades the product.

A further disadvantage is that as the peeled tomato is canned whole, it retains all its seeds inside it, and obliges the housewife to clean the product for use in cooking.

At present the pulp of imperfect tomatoes unsuitable for canning as "peeled tomatoes" is used for producing "tomato concentrate," which is however uneconomical and inconvenient to produce for the industry, as it represents a process based on recovery and not on production.

From the foregoing, it is evident that a process which enabled tomatoes not of the highest quality to be used and which enabled the raw and seed-free product in question to be used in an analogous manner to the peeled tomato, so eliminating all the disadvantages inherent in normal processes, would be useful and economical.

The object of the present invention consists of a machine for preparing tomato pulp for canning in the aforementioned manner, using also partially damaged tomatoes.

Furthermore according to the invention said machine comprises means for separating the seeds from the pulp.

The machine according to the invention consists substantially of a first frame supporting a belt system for conveying the just washed tomatoes. Circular blades driven by a motor project between these belts at their ends and cut the tomatoes on their centre line without however obstructing their progress towards the separator devices supported by a bracket fixed to said frame.

These separator devices each consist of a dihedral of sheet metal bent in the form of a V, the vertex of which points upwards, their purpose being to separate the two parts of the previously cut tomato and make them slide by their flat faces on to a stainless steel conveyor belt supported by a further support frame.

Said steel belt, mounted with its axis horizontal, is provided with a plurality of circular holes regularly distributed over its entire surface, and is rotated by suitable means. Two pressure rollers are mounted suitably spaced apart above its upper surface, the first of which can move elastically in the vertical direction and remain raised from the belt in order to press the tomatoes conveyed on the belt by the necessary amount to expel the seeds, which fall through said circular holes downwards into a discharge screw.

The purpose of the second roller is to squeeze the already cleaned tomatoes by exerting a sufficient pressure to force the pulp to pass through the said circular holes, the actual purpose of these latter being to shred the pulp and so prepare it for canning once it has been conveyed by a screw to the canning machine.

A brush the width of the perforated belt is provided to remove the tomato skins which stick to the outer surface of the conveyor belt, together with any other refuse.

A scraper carries out this operation on the inner surface.

The operational and constructional merits and characteristics of the invention will be more evident from the detailed description of a preferred embodiment thereof given hereinafter purely by way of example, with reference to the accompanying drawings, in which.

Figure 1:
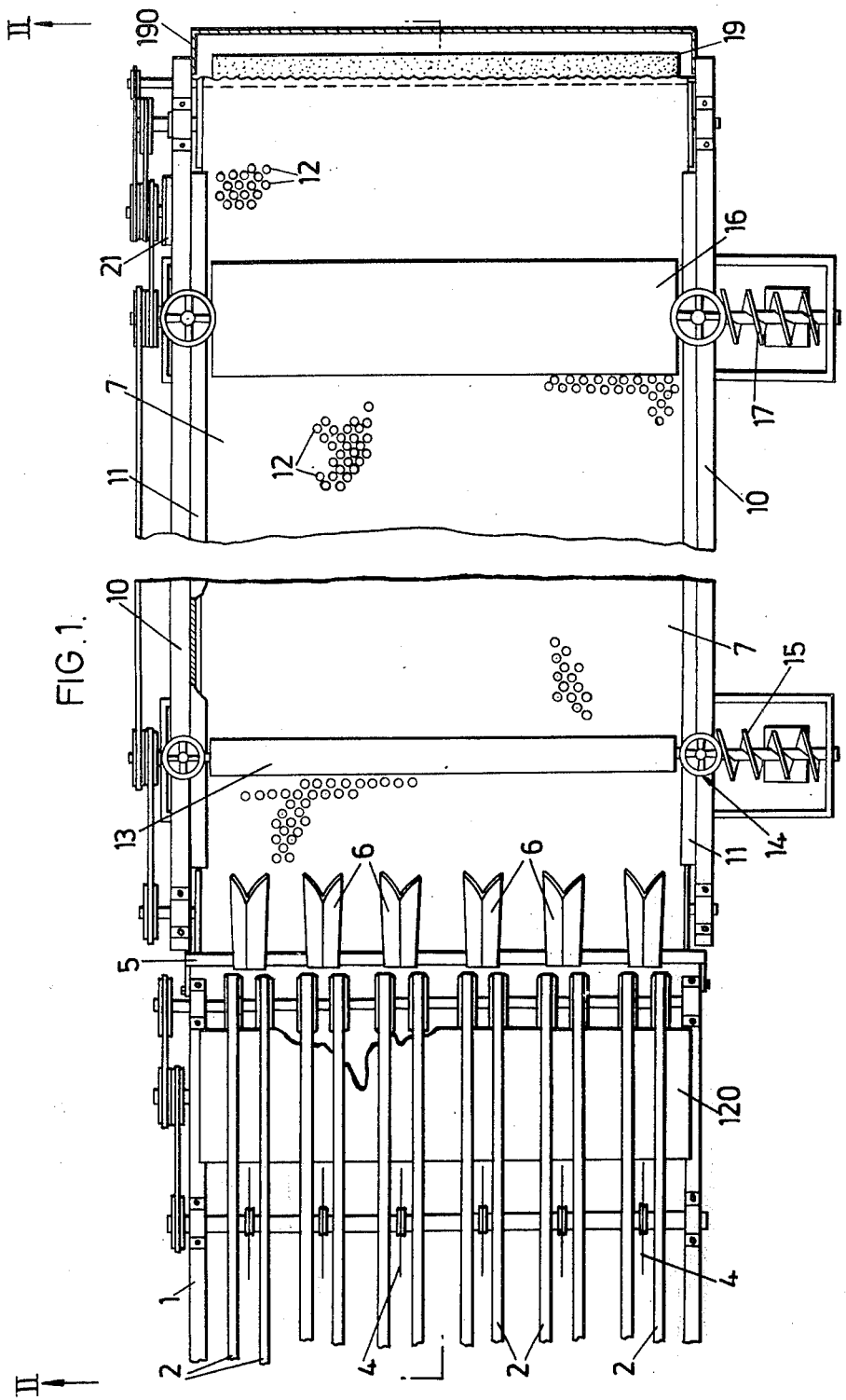
FIG. 1 is a plan view of the squeezing-shredding machine.
Figure 2:
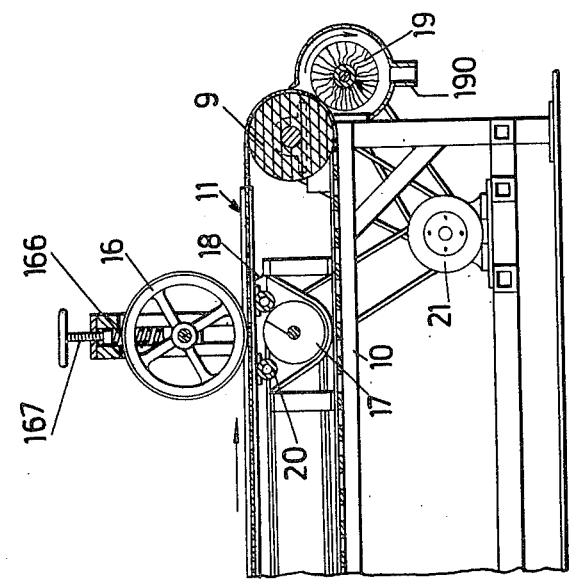
FIG. 2 is a section taken along the line II—II of FIG. 1.
Figure 2:
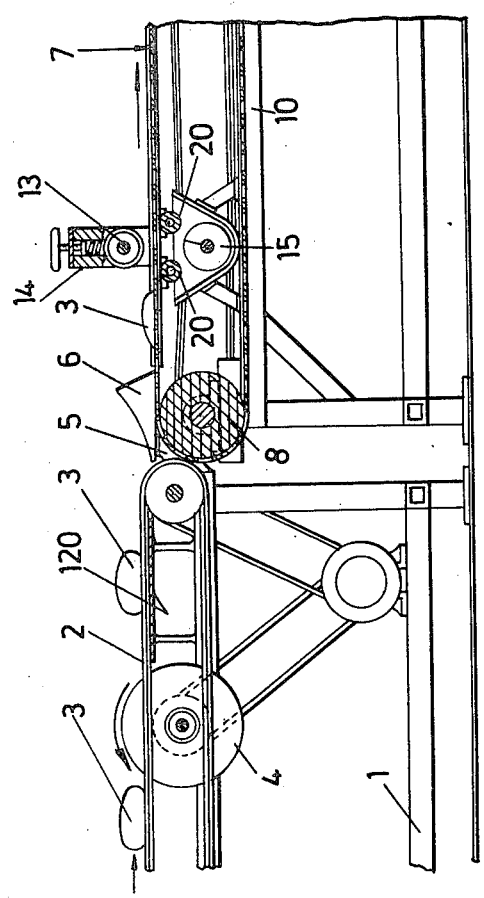

Said figures show a first frame 1 on which are mounted the belts 2 for conveying the tomatoes 3, which meet the circular cutting blades 4 projecting from the surface of the end part of the belts 2, and which cut the tomatoes 3 approximately in half.

A bracket 5 projects from the frame 1 and supports the individual metal separator devices 6, shaped as a dihedral in the form of an inverted V, which separates the two cut parts of the tomato and causes them to slide by their flat face on to the conveyor belt 7. This latter is driven between two rollers 8 and 9 supported horizontally by the frame 10, which constitutes a further support for the metal support and lateral guide channels 11 for the conveyor belt 7.

This belt comprises a plurality of circular holes 12 through which the seeds to be expelled and the shredded pulp of the tomatoes pass.

A sheet metal plate 120 arranged between the ends of the belts 2 prevents the cut halves of the tomatoes from falling downwards.

A roller 13, supported elastically by two supports 14 fixed to the frame 10 presses the tomatoes 3 downwardly by the amount necessary to cause the seeds present in them to pass through the circular holes 12 in the conveyor belt, and fall into an expulsion screw 15 for this refuse.

A second presser roller 16 also pressed elastically on to the belt 7 by the spring 166 adjusted by the screw 167 squeezes the tomatoes so that the pulp present in them becomes shredded by passing through the circular holes in the belt and falls into the screw conveyor 17 which conveys the pieces of pulp to the canning machine.

If the said pulp remains attached to the conveyor belt, a scraper 18 having the same length as the width of the belt 7 causes it to fall into the screw.

A cleaning brush 19 then cleans the conveyor belt of the tomato skins adhering to it and any other processing refuse which falls into the channel 190 from which they are removed, for example by washing with water.

Because of the length of the conveyor belt 7 and the stresses which it is subjected to, it is advantageously further supported, particularly under the presser rollers, by a plurality of rollers 20 supported by the channel guide 11 which supports the conveyor belt.

A conventional geared motor 21 drives the conveyor belt 7, the cleaning brush 19 and screw conveyors 15 and 17 by way of a suitable chain belt system.

The invention is not limited to the single embodiment heretofore described, and modifications and improvements may be made to it without leaving the scope of the invention, the fundamental characteristics of which are summarised in the following claims.

What is claimed is:

1. Machine for squeezing and shredding tomatoes and the like which comprises in combination:
   at least one pair of continuous parallel conveyor belts defining therebetween a channel for supporting and advancing tomatoes from an input to an output end,
   a knife positioned between said belts to cut tomatoes advanced along said belts in half,
   a perforated conveyor belt downstream of said parallel conveyor belts,
   means for guiding cut tomatoes from the output end of said parallel conveyor belts onto said perforated conveyor belt,
   a first pressure roller positioned above said perforated conveyor belt and resiliently biassed toward said belt with a force sufficient to urge the seeds in said cut tomatoes through the perforations in said belt, and
   a second pressure roller positioned above said perforated conveyor belt downstream of said first pressure roller and pressing downwardly on said perforated belt with a force sufficient to drive the pulp of said tomatoes through said perforations.

2. Machine according to claim 1, in which the first pressure roller is disposed slightly spaced apart from the perforated conveyor belt and moves elastically in the vertical direction without applying a braking resistance to the tomatoes.

3. Machine according to claim 1 in which the second pressure roller is kept elastically pressed on the conveyor belt, and is supported by two supports fixed to a frame supporting the perforated conveyor belt.

4. Machine according to claim 1 comprising means for conveying the seeds and the shredded tomato pulp, consisting of two screw conveyors extending transversely beneath the conveyor belt at each of the two idle pressure rollers.

5. Machine according to claim 1 comprising means for supporting the perforated conveyor belt in the area of the pressure rollers, consisting of a series of idle horizontal rollers beneath said perforated belt.

6. Machine according to claim 1 comprising means for guiding and supporting the perforated conveyor belt, consisting of two lateral channel sections along the upper edges of the said conveyor belt.

7. Machine according to claim 1, in which the guide means for the cut tomatoes consists of a series of V-shaped strips with their vertices facing upwards, so as to position the two cut parts of the tomato on the perforated conveyor belt.

8. Machine according to claim 1 comprising a cleaning brush disposed in a collection channel for the refuse, which extends the full width of the tomato conveyor belt and which is positioned to clean the upper face of said belt.

9. Machine according to claim 1, comprising a scraper beneath and transversely of the perforated conveyor belt downstream of the second pressure roller, and equal in length to the width of the belt.

* * * * *